United States Patent
Watai et al.

(10) Patent No.: US 7,993,061 B2
(45) Date of Patent: Aug. 9, 2011

(54) SLIDING BEARING

(75) Inventors: Tadashi Watai, Fujisawa (JP);
Kazuyuki Miyata, Fujisawa (JP);
Ryohei Kaneko, Fujisawa (JP)

(73) Assignee: Oiles Corporation, Tokyo (JP)

( * ) Notice: Subject to any disclaimer, the term of this patent is extended or adjusted under 35 U.S.C. 154(b) by 608 days.

(21) Appl. No.: 12/216,075

(22) Filed: Jun. 30, 2008

(65) Prior Publication Data

US 2008/0310780 A1 Dec. 18, 2008

Related U.S. Application Data

(63) Continuation of application No. 11/808,179, filed on Jun. 7, 2007, now Pat. No. 7,407,329, which is a continuation of application No. 10/528,777, filed as application No. PCT/JP03/00411 on Jan. 20, 2003, now Pat. No. 7,293,918.

(30) Foreign Application Priority Data

Oct. 3, 2002 (JP) ................................. 2002-291558
Nov. 11, 2002 (JP) ................................. 2002-326536

(51) Int. Cl.
*F16C 17/04* (2006.01)
(52) U.S. Cl. ....................................................... 384/420
(58) Field of Classification Search .......... 384/420–427, 384/125
See application file for complete search history.

(56) References Cited

U.S. PATENT DOCUMENTS

| 3,075,816 A | 1/1963 | Harris et al. |
| 4,239,301 A | 12/1980 | Pannwitz |
| 4,854,745 A | 8/1989 | Kamimura et al. |
| 4,907,289 A | 3/1990 | Kamimura et al. |
| 4,923,312 A | 5/1990 | Kamimura et al. |
| 4,969,752 A | 11/1990 | Kubota et al. |
| 5,476,326 A | 12/1995 | Ueno et al. |
| 7,293,918 B2 | 11/2007 | Watai et al. |
| 2003/0210839 A1 | 11/2003 | Gosis et al. |
| 2004/0240761 A1 | 12/2004 | Watai et al. |
| 2006/0215944 A1 | 9/2006 | Watai et al. |
| 2007/0237439 A1 | 10/2007 | Watai et al. |

FOREIGN PATENT DOCUMENTS

| JP | 4-060221 | 2/1992 |
| JP | 5-044716 | 2/1993 |
| JP | 5-071540 | 3/1993 |
| JP | 7-269562 | 10/1995 |
| JP | 9-049529 | 2/1997 |
| JP | 11-303873 | 11/1999 |
| WO | 02/068835 | 9/2002 |

OTHER PUBLICATIONS

International Search Report for PCT/JP03/00411 mailed Apr. 22, 2003.
Microfilm of the specification and drawings annexed to the request of Japanese Utility Model Application No. 037230/1988 (Laid Open No. 141926/1989); Oiles Corporation; Sep. 1989.
CD-ROM of the specification and drawings annexed to the request of Japanese Utility Model Application No. 036861/1991 (Laid Open No. 122812/1992); Sumitomo Construction Machinery Co., Ltd.; Nov. 1992.

*Primary Examiner* — Thomas R Hannon
(74) *Attorney, Agent, or Firm* — Nixon & Vanderhye P.C.

(57) ABSTRACT

A sliding bearing (1) includes an upper casing (3) which is made of polyacetal resin as a synthetic resin, has an annular surface (2), and serves as a first bearing body; a second bearing body (5) which is made of a synthetic resin, is superposed on the upper casing (3) so as to be rotatable about an axis (O), and has an synthetic resin-made annular surface (4) opposed to the annular surface (2); and a synthetic resin-made annular sheet (6) which is interposed between the annular surfaces (2) and (4) and slidably abuts against at least one of the upper casing (3) and the bearing body (5).

16 Claims, 12 Drawing Sheets

SLIDING BEARING

CROSS-REFERENCE TO RELATED APPLICATIONS

This application is a continuation of U.S. application Ser. No. 11/808,179, filed Jun. 7, 2007, now allowed, which is a continuation of U.S. application Ser. No. 10/528,777, filed Mar. 22, 2005, now U.S. Pat. No. 7,293,918, which claims the benefit of International Application No. PCT/JP2003/000411 filed Jan. 20, 2003, which designated the U.S., and claims the benefit of JP 2002-291558, filed Oct. 3, 2002, and JP 2002-326536, filed Nov. 11, 2002, each incorporated herein by reference in its entirety.

TECHNICAL FIELD

The present invention relates to a sliding bearing, and more particularly to a synthetic resin-made sliding bearing which is suitably incorporated as a thrust sliding bearing of a strut-type suspension (Macpherson type) in a four-wheeled vehicle.

BACKGROUND ART

In general, a strut-type suspension is mainly used in a front wheel of a four-wheeled vehicle, and is constructed such that a strut assembly incorporating a hydraulic shock absorber in a outer cylinder formed integrally with a main shaft is combined with a coil spring. Among such suspensions, there is a type of structure in which the axis of the coil spring is actively offset with respect to the axis of the strut, so as to allow the sliding of a piston rod of the shock absorber incorporated in the strut to be effected smoothly. There is another type of structure in which the coil spring is disposed by aligning the axis of the coil spring with the axis of the strut. In either structure, a thrust bearing is disposed between a mounting member of a vehicle body and an upper spring seat of the coil spring to allow the rotation to be effected smoothly when the strut assembly rotates together with the coil spring by the steering operation.

In this thrust bearing, a rolling bearing using balls or needles or a synthetic resin-made sliding bearing is used. However, the rolling bearing has a possibility that fatigue failure occurs in the balls or needles due to fine vibrations and vibration load or the like, and there is a problem in that it is difficult to maintain smooth steering operation. The sliding bearing has problems in that since its friction torque is high as compared with the rolling bearing, an increase in the thrust load results in an increase in the friction torque, which renders the steering operation heavy, and that, depending on a combination of synthetic resins, the stick-slip phenomenon occurs, frequently producing frictional noise attributable to the stick-slip phenomenon.

In addition, a lubricant such as grease is applied to the sliding bearing, and the above-described frictional noise practically does not occur insofar as such a lubricant is present, as desired, on the sliding surface. However, there can be cases where the frictional noise begins to be produced due to the dissipation or the like of the lubricant over long periods of use.

In addition, since the sliding bearing is generally constructed by including two bearing bodies which are superposed on each other, there is a problem, among others, in that in a case where required friction characteristics cannot be obtained between the two bearing bodies, the design or fabrication of these two bearing bodies must be carried out again.

It should be noted that the above-described problems do not necessarily occur only in the thrust sliding bearing incorporated in the strut-type suspension, but can similarly occur in general sliding bearings.

The present invention has been devised in view of the above-described aspects, and its object is to provide a sliding bearing in which even if the thrust load increases, the friction torque practically does not change to make it possible to form the sliding surface with a low friction torque and maintain such a low coefficient of friction over long periods of use, which is free of the occurrence of frictional noise at the sliding surface, which makes it possible to easily adjust the coefficient of friction to obtain an optimum coefficient of friction, and which, when incorporated into the strut-type suspension as a thrust sliding bearing, makes it possible to ensure smooth steering operation equivalent to that of the rolling bearing, and is capable of readily adjusting the coefficient of friction optimally so as to make it possible to eliminate the flutter phenomenon of a steering wheel.

DISCLOSURE OF THE INVENTION

A sliding bearing in accordance with the invention comprises: a first bearing body having an annular surface; a second bearing body which is superposed on the first bearing body so as to be rotatable about an axis of the first bearing body, and has an annular surface opposed to the annular surface of the first bearing body; and a synthetic resin-made annular sheet which is interposed between the annular surfaces and slidably abuts against at least one of the bearing bodies.

According to the sliding bearing in accordance with the invention, since the synthetic resin-made annular sheet, which slidably abuts against at least one of the bearing bodies, is interposed between the annular surfaces, by merely replacing such a sheet, the coefficient of friction between the first bearing body and the second bearing body can be easily adjusted to obtain an optimum coefficient of friction. Further, when the sliding bearing is incorporated into the strut-type suspension as a thrust sliding bearing, smooth steering operation equivalent to that of the rolling bearing can be ensured, and the coefficient of friction can readily be adjusted optimally so as to make it possible to eliminate the flutter phenomenon of the steering wheel.

The annular sheet is preferably formed of a synthetic resin including at least one of polyamide resin, polyester resin, polyolefin resin, polycarbonate resin, and fluororesin, and preferably has a thickness of from 0.05 mm to 1.0 mm.

Both of the bearing bodies are preferably formed of a synthetic resin. Specifically, both of the bearing bodies are preferably formed of a synthetic resin including at least one of polyacetal resin, polyamide resin, polyester resin, polyolefin resin, polycarbonate resin, and fluororesin. More preferably, the first bearing body is formed of polyacetal resin, and the second bearing body is formed of a synthetic resin including at least one of polyacetal resin, polyamide resin, polyolefin resin, and fluororesin.

Preferably, the first bearing body at a radially outer peripheral edge portion thereof is adapted to be resiliently fitted to the second bearing body at a radially outer peripheral edge portion of the second bearing body. In addition, a labyrinth is formed between the bearing bodies in at least one of the outer peripheral edge portions and inner peripheral edge portions, as viewed in a radial direction, of both of the bearing bodies. By virtue of such a labyrinth, it becomes possible to satisfactorily prevent the entry of dust, muddy water, and the like onto a sliding surface between the first bearing body and the second bearing body.

The second bearing body has a projection formed integrally on the annular surface thereof, and the sheet is interposed between the projection and the annular surface of the first bearing body and slidably abuts against at least one of the projection and the annular surface of the first bearing body. With the sliding bearing including the second bearing body having such projection, a closed recess surrounded by the projection is formed on the annular surface of the second bearing body, and a fluid is adapted to be filled in at least one of the closed recess and an annular closed space between the annular sheet and the annular surface of the first bearing body and corresponding to the closed recess.

According to this sliding bearing, it also becomes possible for the thrust load to be received in a shared manner by the fluid filled in at least one of the closed recess and the closed space. As a result, the sliding surface of the second bearing body with respect to the annular surface of the first bearing body can be formed by the surface of the fluid filled in at least one of the closed recess and the closed space. Thus, the sliding bearing has an extremely low coefficient of friction due to the contact surface of the fluid. Accordingly, the relative rotation of the second bearing body about the axis of the first bearing body with respect to the first bearing body can be effected with an extremely low frictional resistance even under the thrust load. Moreover, since such the fluid is filled in at least one of the closed recess and the closed space sealed by the sheet which is capable of functioning also as a seal member, it is possible to maintain the aforementioned low coefficient of friction over long periods of use, and eliminate the occurrence of frictional noise at the sliding surface. Also, even when the sliding bearing is incorporated in the strut-type suspension, it is possible to ensure smooth steering operation equivalent to that of the rolling bearing.

Accordingly, it suffices if the fluid filled in at least one of the closed recess and the closed space is adapted to receive a thrust load.

The projection is preferably adapted to be flexurally deformed under a thrust load so as to make small at least one of a fluid filling capacity of the closed recess and a fluid filling capacity of the closed space. More specifically, the projection is adapted to be flexurally deformed under a thrust load so as to cause the fluid in at least one of the closed recess and the closed space to generate internal pressure by making small at least one of the fluid filling capacity of the closed recess and the fluid filling capacity of the closed space.

The fluid which is filled in at least one of the closed recess and the closed space includes at least one of grease and lubricating oil, and is more preferably constituted by silicone-based grease.

The projection in a preferred example includes at least an inner annular projection disposed on an inner peripheral side and an outer annular projection disposed radially outwardly of and substantially concentrically with the inner annular projection. In another preferred example, the projection includes at least an inner annular projection disposed on an inner peripheral side, an outer annular projection disposed radially outwardly of and substantially concentrically with the inner annular projection, and a radial protrusion extending radially and connected integrally to respective ones of the inner annular projection and the outer annular projection.

The projection may further include at least one intermediate annular projection disposed between and substantially concentrically with the inner annular projection and the outer annular projection, as viewed in the radial direction. If the projection includes such an intermediate annular projection in addition to the inner annular projection and the outer annular projection, even if an unbalanced load is applied to that sliding bearing in the thrust direction, it is possible to reduce uneven deflection of the inner annular projection and the outer annular projection. Furthermore, it is possible to favorably hold the closed state (hermetically sealed state) of the closed recess or the closed space. Thus, the reception of the thrust load by the fluid can be maintained over long periods of time without leakage of the fluid from the closed recess or the closed space.

In the present invention, the second bearing body may be formed of an integrated one-piece member, but alternatively may include a bearing member and an annular piece disposed between the bearing member and the first bearing body so as to be rotatable about the axis of the first bearing body with respect to at least one of the first bearing body and the bearing member. Here, the annular piece has the annular surface opposing the synthetic resin-made annular surface of the first bearing body as well as the projection formed integrally on the annular surface. It should be noted that the second bearing body in accordance with the invention may be formed by the bearing member and the annular piece not having the projection.

In the second bearing body having two members including the bearing member and the annular piece, preferably, the bearing member is formed of polyacetal resin, and the annular piece is formed of a synthetic resin including at least one of polyamide resin, polyolefin resin, and fluororesin.

Preferably, the annular piece has another annular surface disposed oppositely to the annular surface opposing the annular surface of the first bearing body as well as other projection formed integrally on the other annular surface, and the bearing member has a synthetic resin-made annular surface opposing the other annular surface of the annular piece and slidably abutting against the other projection. Alternatively, the second bearing body in accordance with the invention may be formed by the bearing member and the annular piece not having the projection.

In the case where the second bearing body in accordance with the invention is formed by the bearing member and the annular piece not having the projection, the annular surface of the bearing member may be directly abutted against the other annular surface of the annular piece. Alternatively, however, another annular sheet may be interposed between the annular surface of the bearing member and the other annular surface of the annular piece. In addition, in the case where the annular piece has the other projection, a synthetic resin-made other annular sheet may be interposed between the annular surface of the bearing member and the other projection, and the other annular sheet may slidably abut against at least one of the annular surface of the bearing member and the other projection.

In the same way as the aforementioned sheet, the other annular sheet may be formed of a synthetic resin including at least one of polyamide resin, polyester resin, polyolefin resin, polycarbonate resin, and fluororesin, and may have a thickness of from 0.05 nm to 1.0 mm.

Another closed recess surrounded by the other projection may be formed on the other annular surface of the annular piece, and another fluid may be adapted to be filled in at least one of the other closed recess and another annular closed space formed between the annular surface of the bearing member and the other annular sheet corresponding to the other closed recess. Preferably, the other fluid filled in the other closed recess and the other closed space is adapted to receive a thrust load. More preferably, the other projection is adapted to be flexurally deformed under a thrust load so as to make small at least one of a fluid filling capacity of the other closed recess and a fluid filling capacity of the other closed space. In addition, the other projection may be adapted to be flexurally deformed under a thrust load so as to cause the other fluid in at least one of the other closed recess and the other closed space to generate internal pressure by making small at least one of the fluid filling capacity of the other closed recess and the fluid filling capacity of the other closed space.

Preferably, the other fluid also includes at least one of grease and lubricating oil, and is more preferably constituted by silicone-based grease.

In the same way as the aforementioned projection, the other projection may include at least other inner annular projection disposed on an inner peripheral side and other outer annular projection disposed radially outwardly of and substantially concentrically with the other inner annular projection, or may include at least other inner annular projection disposed on an inner peripheral side, other outer annular projection disposed radially outwardly of and substantially concentrically with the other inner annular projection, and other radial protrusion extending radially and connected integrally to respective ones of the other inner annular projection and the other outer annular projection.

The other projection may further include at least one other intermediate annular projection disposed between and substantially concentrically with the other inner annular projection and the other outer annular projection, as viewed in the radial direction. If the other projection includes such another intermediate annular projection in addition to the other inner annular projection and the other outer annular projection, even if an unbalanced load is applied to that sliding bearing in the thrust direction, it is possible to reduce uneven deflection of the other inner annular projection and the other outer annular projection. Furthermore, it is possible to favorably hold the closed state (hermetically sealed state) of the other closed recess or the other closed space. Thus, the reception of the thrust load by the other fluid can be maintained over long periods of time without leakage of the other fluid from the other closed recess or the other closed space.

In the present invention, the first and the second bearing bodies may respectively have mutually opposing cylindrical surfaces. In this case, a synthetic resin-made cylindrical sheet may be interposed between both cylindrical surfaces, and the cylindrical sheet may slidably abut against at least one of both cylindrical surfaces.

Preferably, in the same way as the aforementioned sheet, the cylindrical sheet may also be formed of a synthetic resin including at least one of polyamide resin, polyester resin, polyolefin resin, polycarbonate resin, and fluororesin, and may have a thickness of from 0.05 mm to 1.0 mm.

Preferably, the sliding bearing in accordance with the present invention is for use as a thrust sliding bearing of a strut-type suspension in a four-wheeled vehicle. However, the present invention is not limited to the same, and the sliding bearing in accordance with the present invention may be used for other types.

Preferably, the sliding bearing in accordance with the present invention is for use as a thrust sliding bearing of a strut-type suspension in a four-wheeled vehicle. Here, the first bearing body may be the upper casing or the lower casing, while the second bearing body may be the lower casing or the upper casing. The first bearing body may be the upper casing, while the second bearing body may be constituted by the bearing piece and the lower casing. Further, the first bearing body may be constituted by the lower casing, while the second bearing body may be the bearing piece and the upper casing.

According to the present invention, it is possible to provide a synthetic resin-made sliding bearing in which even if the thrust load increases, the friction torque practically does not change to make it possible to form the sliding surface with a low friction torque and maintain such a low coefficient of friction over long periods of use, which is free of the occurrence of frictional noise at the sliding surface, which makes it possible to easily adjust the coefficient of friction to obtain an optimum coefficient of friction, and which, when incorporated into the strut-type suspension as a thrust sliding bearing, makes it possible to ensure smooth steering operation equivalent to that of the rolling bearing, and is capable of readily adjusting the coefficient of friction optimally so as to make it possible to eliminate the flutter phenomenon of the steering wheel.

Hereafter, a description will be given of the present invention and the mode for carrying out the invention with reference to the preferred embodiments shown in the drawings. It should be noted that the present invention is not limited to these embodiments.

EMBODIMENTS

Figure 1:
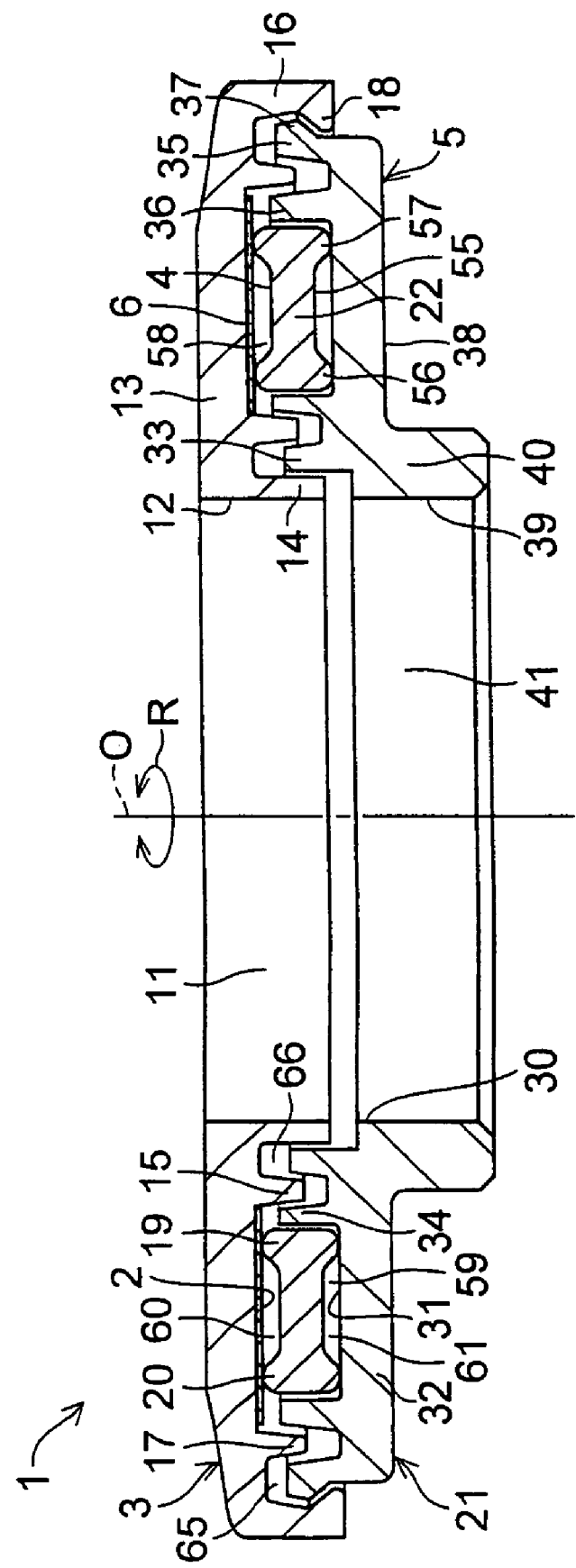
FIG. 1 is a cross-sectional view of a preferred embodiment of the invention.
Figure 2:
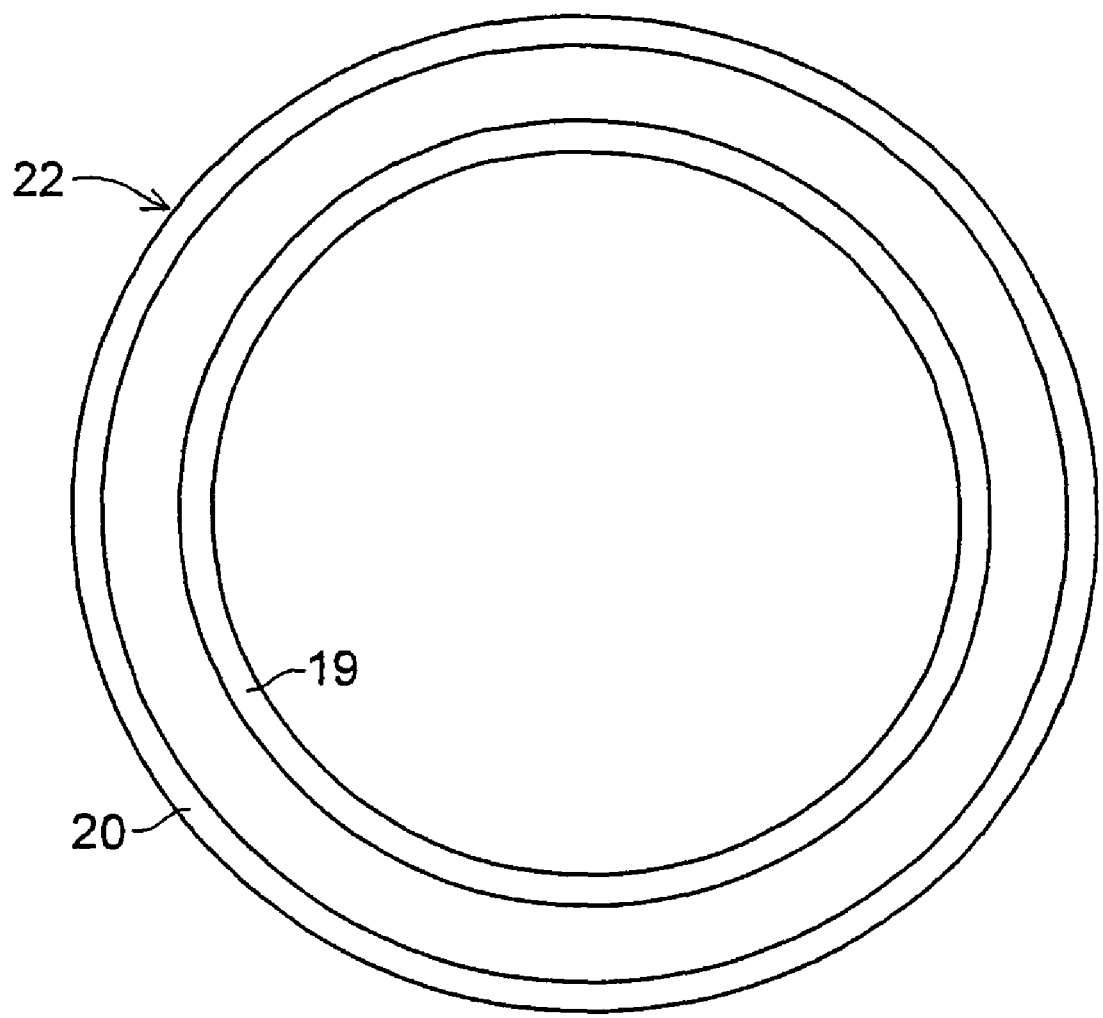
FIG. 2 is a plan view of an annular piece in accordance with the embodiment shown in FIG. 1.
Figure 3:
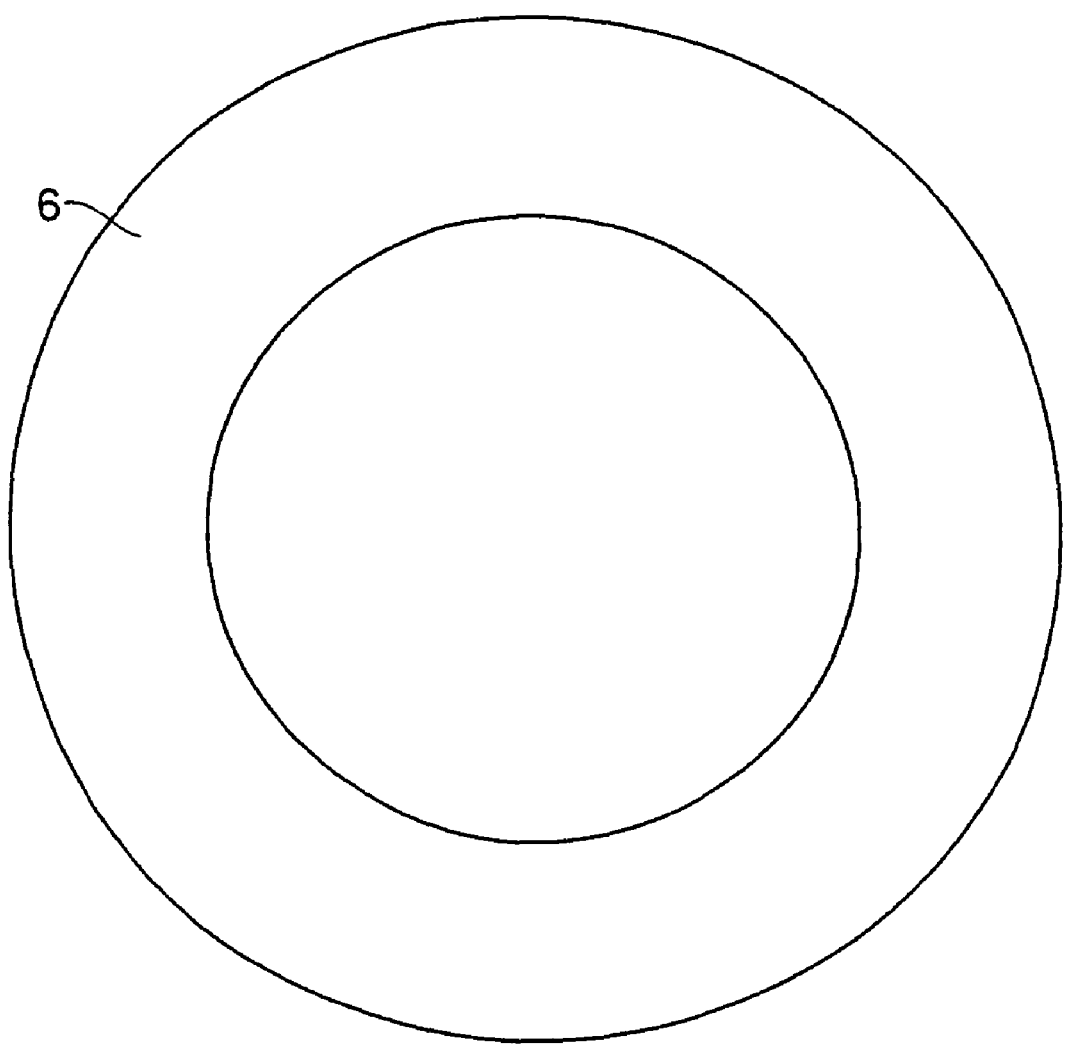
FIG. 3 is a plan view of a sheet of the embodiment shown in FIG. 1.

In FIGS. 1 to 3, a sliding bearing 1 for use in a strut-type suspension in a four-wheeled vehicle in accordance with this embodiment is comprised of an upper casing 3 having an annular surface 2, which is made of polyacetal resin as a synthetic resin, and serves as a first bearing body; a second bearing body 5 which is superposed on the upper casing 3 so as to be rotatable about an axis O of the upper casing 3 in an R direction, and has an annular surface 4 made of a synthetic resin and opposed to the annular surface 2 of the upper casing 3; and a synthetic resin-made annular sheet 6 which is interposed between the annular surfaces 2 and 4 and slidably abuts against at least one of the upper casing 3 and the bearing body 5, i.e., against both of the upper casing 3 and the bearing body 5 in this embodiment.

The synthetic resin-made upper casing 3 is formed integrally with and includes an annular upper casing body portion 13 having the annular surface 2 and an inner peripheral surface 12 for defining a circular hole 11 in a central portion; an innermost peripheral-side cylindrical suspended portion 14 formed integrally with a radially inner peripheral edge of the upper casing body portion 13 and suspended toward the bearing body 5; an inner peripheral-side cylindrical suspended portion 15 disposed radially outwardly of the innermost peripheral-side cylindrical suspended portion 14, formed integrally with the annular surface 2, and suspended toward the bearing body 5; a cylindrical suspended engaging portion 16 formed integrally with a radially outer peripheral edge of the upper casing body portion 13; an outer peripheral-side cylindrical suspended portion 17 disposed radially inwardly of the cylindrical suspended engaging portion 16 and radially outwardly of the inner peripheral-side cylindrical suspended portion 15, and formed integrally with the annular surface 2; and an engaging hook portion 18 formed on a radially inner peripheral surface of the cylindrical suspended engaging portion 16.

The bearing body 5 has a projection formed integrally with the annular surface 4 and including an inner annular projection 19 disposed on an inner peripheral side and an outer annular projection 20 disposed radially outwardly of and substantially concentrically with the inner annular projection 19. The bearing body 5 includes a polyacetal resin-made lower casing 21 serving as a bearing member; and an annular piece 22 which is disposed between the lower casing 21 and the upper casing 3 rotatably about the axis O of the upper casing 3 with respect to at least one, both in this embodiment, of the upper casing 3 and the lower casing 21, and which is formed of a synthetic resin, preferably a synthetic resin including at least one of polyamide resin, polyolefin resin, and fluororesin.

The synthetic resin-made lower casing 21 is formed integrally and includes the following: an annular lower casing body portion 32 having an inner peripheral surface 30 and an annular surface 31; an innermost peripheral-side cylindrical protruding portion 33 formed integrally with a radially inner peripheral edge of the lower casing body portion 32 and protruding toward the upper casing 3 so as to be disposed between the innermost peripheral-side cylindrical suspended portion 14 and the inner peripheral-side cylindrical suspended portion 15; an inner peripheral-side cylindrical protruding portion 34 disposed radially outwardly of the innermost peripheral-side cylindrical protruding portion 33, formed integrally with the annular surface 31, and protruding toward the upper casing 3; a cylindrical protruding engaging portion 35 formed integrally with a radially outer peripheral edge of the lower casing body portion 32 and protruding toward the upper casing 3 so as to be disposed between the cylindrical suspended engaging portion 16 and the outer peripheral-side cylindrical suspended portion 17; an outer peripheral-side cylindrical protruding portion 36 disposed radially inwardly of the cylindrical protruding engaging portion 35 and radially outwardly of the inner peripheral-side cylindrical protruding portion 34, formed integrally with the annular surface 31, and protruding toward the upper casing 3; an engaging hook portion 37 formed on a radial outer peripheral surface of the cylindrical protruding engaging portion 35 and adapted to engage the engaging hook portion 18; and a cylindrical portion 40 formed integrally with an outer surface 38 of the lower casing body portion 32 on a radially inner peripheral side of the lower casing body portion 32, having an inner peripheral surface 39 continuing to the inner peripheral surface 30, and protruding downward. A circular hole 41 in a central portion of the lower casing body portion 32, which is substantially concentric with the circular hole 11, is defined by the inner peripheral surface 30 and the inner peripheral surface 39.

The innermost peripheral-side cylindrical protruding portion 33 is formed such that its height H1 from the annular surface 31 is lower than the height H2 of the inner peripheral-side cylindrical protruding portion 34 similarly from the annular surface 31. Likewise, the cylindrical protruding engaging portion 35 is formed such that its height H3 from the annular surface 31 is lower than the height H4 of the outer peripheral-side cylindrical protruding portion 36 similarly from the annular surface 31 (see FIG. 5). It should be noted that the present invention is not limited to the sane, and, for example, the innermost peripheral-side cylindrical protruding portion 33 and the inner peripheral-side cylindrical protruding portion 34 may be set to be at the same height (H1=H2) and the cylindrical protruding engaging portion 35 and the outer peripheral-side cylindrical protruding portion 36 may be set at the same height (H3=H4).

In addition to the annular surface 4 opposing the annular surface 2 and the inner annular projection 19 and the outer annular projection 20 formed integrally with the annular surface 4, the annular piece 22 has another annular surface 55 disposed oppositely to the annular surface 4 as well as other projection including an inner annular projection 56 disposed on the inner peripheral side and an outer annular projection 57 disposed radially outwardly of and substantially concentrically with the inner annular projection 56 and formed integrally with annular surface 55. The synthetic resin-made annular surface 31 of the lower casing 21 opposing the annular surface 55 of the annular piece 22 slidably abuts against the inner annular projection 56 and the outer annular projection 57 which are formed in the same way as the inner annular projection 19 and the outer annular projection 20.

An annular closed recess 58 surrounded by the inner annular projection 19 and the outer annular projection 20 is formed on the annular surface 4, while an annular closed recess 59 surrounded by the inner annular projection 56 and the outer annular projection 57 is formed on the annular surface 55. The closed recesses 58 and 59 are fully filled with fluids 60 and 61 constituted by at least one of grease and lubricating oil, preferably silicone-based grease.

The sheet 6, which is formed of a synthetic resin, preferably a synthetic resin including at least one of polyamide resin, polyester resin, polyolefin resin, polycarbonate resin, and fluororesin and has a thickness of from 0.05 mm to 1.0 mm, is interposed between the annular surface 2 and the projection including the inner annular projection 19 and the outer annular projection 20, and slidably abuts against at least one of the annular surface 2 and the projection including the inner annular projection 19 and the outer annular projection 20, i.e., against both of them in this embodiment.

The closed recess 58 is surrounded by the inner annular projection 19 and the outer annular projection 20 such that its area opposing the sheet 6 is greater than the total area of the inner annular projection 19 and the outer annular projection 20 which slidably abut against the sheet 6. In other words, the closed recess 58 is surrounded by the inner annular projection 19 and the outer annular projection 20 such that the area of the fluid 60 contacting the sheet 6 is greater than the total area of the inner annular projection 19 and the outer annular projection 20 which slidably abut against the sheet 6. The closed recess 59 is surrounded by the inner annular projection 56 and the outer annular projection 57 such that its area opposing the annular surface 31 is greater than the total area of the inner annular projection 56 and the outer annular projection 57 which slidably abut against the annular surface 31. In other words, the closed recess 59 is surrounded by the inner annular projection 56 and the outer annular projection 57 such that the area of the fluid 61 contacting the annular surface 31 is greater than the total area of the inner annular projection 56 and the outer annular projection 57 which slidably abut against the annular surface 31.

Under a thrust load, the inner annular projection 19 and the outer annular projection 20 are adapted to abut against the sheet 6 in such a manner as to be flexurally deformed, so as to cause the fluid 60 in the closed recess 58 to generate internal pressure by making the fluid filling capacity of the closed recess 58 small. Under a thrust load, the inner annular projection 56 and the outer annular projection 57 are also adapted to abut against the annular surface 31 in such a manner as to be flexurally deformed, so as to cause the fluid 61 in the closed recess 59 to generate internal pressure by making the fluid filling capacity of the closed recess 59 small.

The upper casing 3 at the engaging hook portion 18 of the cylindrical suspended engaging portion 16 of its radially outer peripheral edge portion is adapted to be resiliently fitted and secured to the lower casing 21 by being resiliently engaged in a snap-fit fashion with the engaging hook portion 37 of the cylindrical protruding engaging portion 35 of the radially outer peripheral edge portion in the lower casing 21.

In at least one portions of the radially outer peripheral edge portions and inner peripheral edge portions of the upper casing 3 and the lower casing 21, i.e., both peripheral edge portions in this embodiment, a labyrinth 65 is arranged to be formed between the upper casing 3 and the lower casing 21 by the upper casing body portion 13, the cylindrical suspended engaging portion 16, and the outer peripheral-side cylindrical suspended portion 17, as well as the lower casing body portion 32, the cylindrical protruding engaging portion 35, and the outer peripheral-side cylindrical protruding portion 36. A labyrinth 66 is arranged to be formed by the upper casing body portion 13, the innermost peripheral-side cylindrical suspended portion 14, and the inner peripheral-side cylindrical suspended portion 15, as well as the lower casing body portion 32, the innermost peripheral-side cylindrical protruding portion 33, and the inner peripheral-side cylindrical protruding portion 34. Entry of dust, muddy water, and the like from the outside into the closed recesses 58 and 59 is prevented by such a labyrinth 65 at the outer peripheral edge portion and such a labyrinth 66 at the inner peripheral edge portion.

Figure 4:
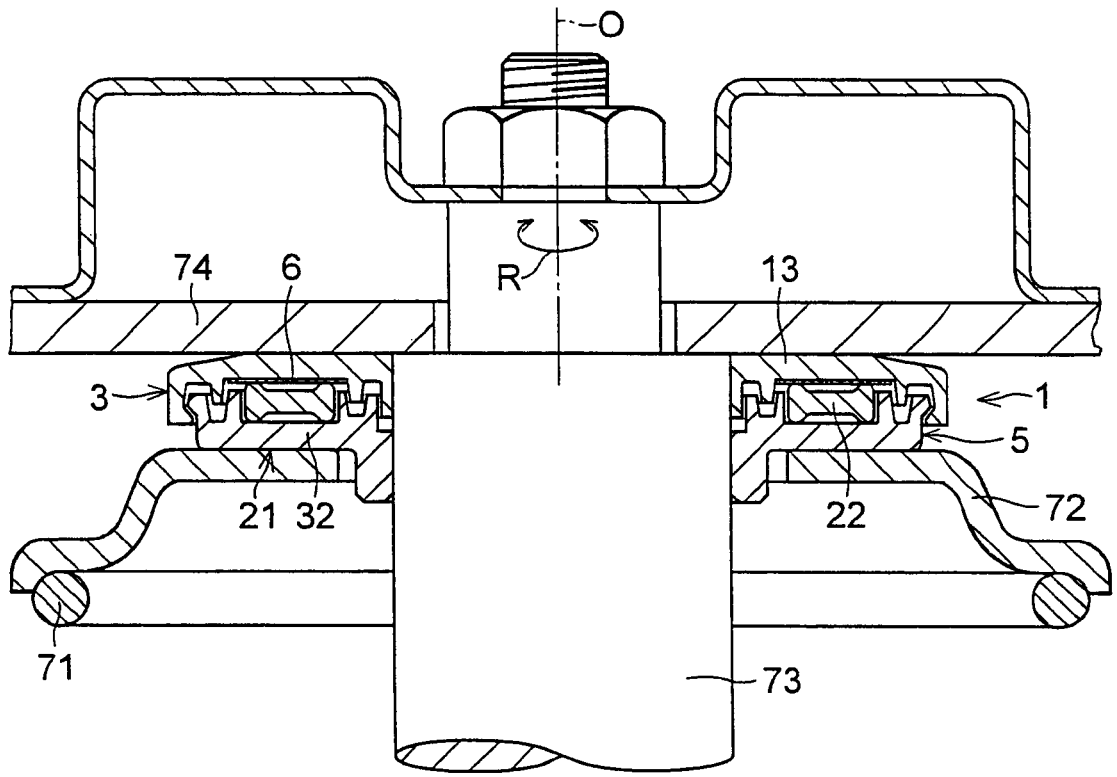
FIG. 4 is an explanatory diagram of an example in which the embodiment shown in FIG. 1 is incorporated in a strut-type suspension.

The above-described sliding bearing 1 is used by being fitted between an upper spring seat 72 of a coil spring 71 in a strut-type suspension assembly on the one hand, and a mounting member 74 on the vehicle body side to which a piston rod 73 of a hydraulic damper is secured on the other hand, as shown in FIG. 4. In this case, an upper portion of the piston rod 73 is inserted in the circular holes 11 and 41 so as to be rotatable about the axis O in the R direction with respect to the upper casing 3 and the lower casing 21.

In the strut-type suspension assembly installed by means of the sliding bearing 1, as shown in FIG. 4, at the time of the steering operation, the relative rotation of the upper spring seat 72 about the axis O in the R direction by means of the coil spring 71 is smoothly effected by the relative rotation of the lower casing 21 in the same direction with respect to the upper casing 3.

Then, according to the sliding bearing 1, the synthetic resin-made annular sheet 6, which slidably abuts against the upper casing body portion 13 of the upper casing 3 and the inner annular projection 19 and the outer annular projection 20 of the annular piece 22, is interposed between the annular surfaces 2 and 4. Therefore, by merely replacing such a sheet 6, the coefficient of friction between the upper casing 3 and the annular piece 22 can be easily adjusted to obtain an optimum coefficient of friction. Further, when the sliding bearing 1 is incorporated into the strut-type suspension as a thrust sliding bearing, smooth steering operation equivalent to that of the rolling bearing can be ensured, and the coefficient of friction can readily be adjusted optimally so as to make it possible to eliminate the flutter phenomenon of the steering wheel.

In addition, according to the sliding bearing 1, the closed recess 58, which is surrounded by the inner annular projection 19 and the outer annular projection 20 slidably abutting against the sheet 6, is formed on the annular surface 4, and the fluid 60 constituted by silicone-based grease is arranged to be filled in such a closed recess 58. At the same time, under a thrust load, the inner annular projection 19 and the outer annular projection 20 are adapted to abut against the sheet 6 in such a manner as to be flexurally deformed, so as to cause the fluid 60 in the closed recess 58 to generate internal pressure by making the fluid filling capacity of the closed recess 58 small. As a result, the thrust load can also be received in a shared manner by the fluid 60 filled in the closed recess 58. In other words, the sliding surface of the lower casing 21 with respect to the sheet 6 is constituted by the surfaces of the inner annular projection 19 and the outer annular projection 20 contacting the sheet 6, as well as the surface of the fluid 60 filled in the closed recess 58 and contacting the sheet 6.

In addition, according to the sliding bearing 1, since the area of the surface of the fluid 60 filled in the closed recess 58 and contacting the sheet 6 is set to be greater than the total area of the inner annular projection 19 and the outer annular projection 20 which slidably abut against the sheet 6, the thrust load borne by the inner annular projection 19 and the outer annular projection 20 decreases substantially. Hence, the frictional resistance between the inner annular projection 19 and the outer annular projection 20 on the one hand, and the sheet 6 on the other hand, is substantially reduced. At the same time, since the frictional resistance due to the surface of the fluid 60 contacting the sheet 6 is extremely small, an extremely low frictional resistance is obtained as a whole. Accordingly, the relative rotation of the lower casing 21 about the axis O of the upper casing 3 in the R direction with respect to the upper casing 3 can be effected with an extremely low frictional resistance even under the thrust load. Moreover, since such a fluid 60 is filled in the closed recess 58 sealed by the sheet 6 which is capable of functioning as a seal member, it is possible to maintain a low coefficient of friction over long periods of use, and eliminate the occurrence of frictional noise at the sliding surface. Also, even when the sliding bearing 1 is incorporated in the strut-type suspension, it is possible to ensure smooth steering operation equivalent to that of the rolling bearing.

With the sliding bearing 1, the closed recess 59 is also filled with the fluid 61, and the inner annular projection 56 and the outer annular projection 57 under a thrust load are adapted to abut against the annular surface 31 in such a manner as to be flexurally deformed, so as to cause the fluid 61 in the closed recess 59 to generate internal pressure by making the fluid filling capacity of the closed recess 59 small. Therefore, even if the frictional resistance between the inner annular projection 19 and the outer annular projection 20 on the one hand, and the sheet 6 on the other hand, becomes large for some cause or other, it is possible to ensure sliding with an extremely low coefficient of friction between the inner annular projection 56 and the outer annular projection 57 on the one hand, and the annular surface 31 on the other hand, in the same way as described above. Thus, the relative rotation of the lower casing 21 about the axis O of the upper casing 3 in the R direction with respect to the upper casing 3 can be effected with an extremely low frictional resistance even under the thrust load, so that the sliding bearing 1 becomes failsafe.

Figure 5:
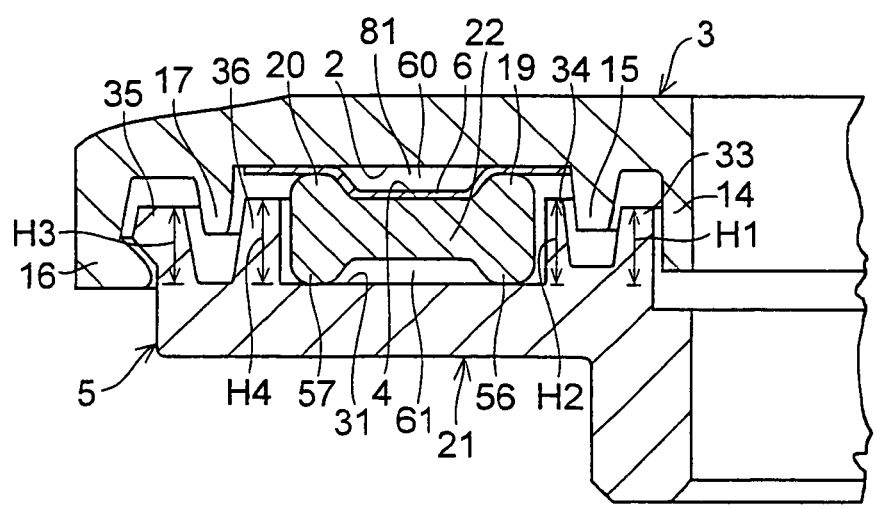
FIG. 5 is a fragmentary cross-sectional view of another preferred embodiment of the invention.

In the above description, the sheet 6 is interposed between the annular surface 2 and the projection comprising the inner annular projection 19 and the outer annular projection 20 by being lined closely to the annular surface 2. Alternatively, as shown in FIG. 5, the sheet 6 may be interposed between the annular surface 2 and the projection including the inner annular projection 19 and the outer annular projection 20 by being lined closely to the annular surface 4, such that an annular closed space 81 corresponding to the closed recess 58 is formed between the sheet 6 and the annular surface 2. In this case, it suffices if the closed space 81 is fully filled with the fluid 60 to receive the thrust load by the fluid 60 filled in the closed space 81, in the same way as described above. In addition, instead of lining the sheet 6 closely to the annular surface 2 or 4, the sheet 6 may be deflected such that both the closed recess 58 and the closed space 81 are formed between the annular surface 2 and the annular surface 4, and both the closed recess 58 and the closed space 81 may be fully filled with the fluid 60.

Figure 6:
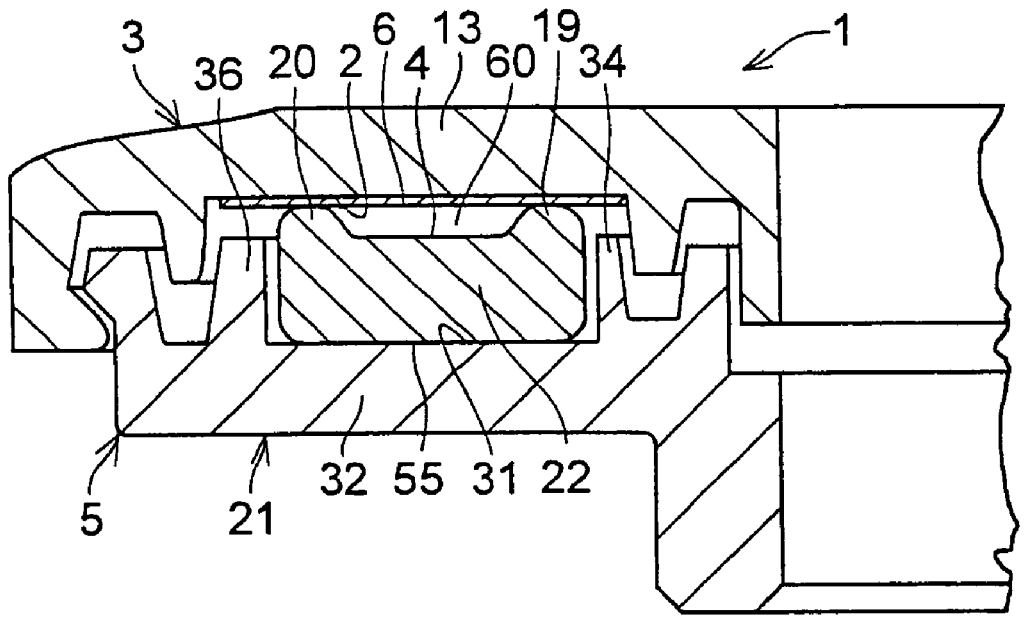
FIG. 6 is a fragmentary cross-sectional view of still another preferred embodiment of the invention.
Figure 7:
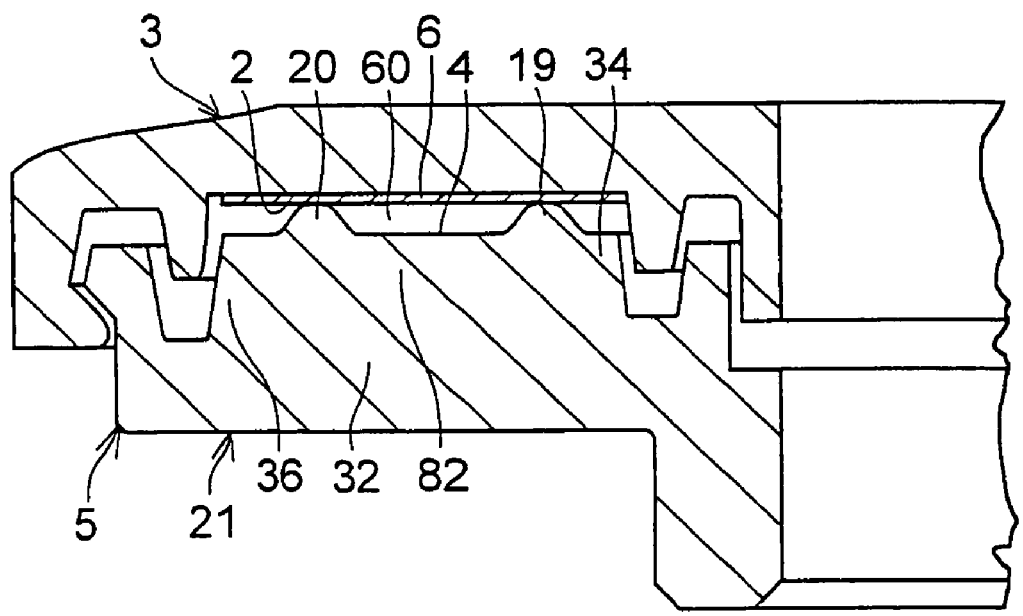
FIG. 7 is a fragmentary cross-sectional view of a further preferred embodiment of the invention.

In addition, with the above-described sliding bearing 1, although the annular piece 22 having the inner annular projection 56 and the outer annular projection 57 on its annular surface 55 is used, the sliding bearing 1 may alternatively be constructed by using the annular piece 22 having the flat annular surface 55 without providing the inner annular projection 56 and the outer annular projection 57, and by causing the annular surface 55 to slidably abut against the flat annular surface 31 of the lower casing body portion 32, as shown in FIG. 6. Further, instead of constructing the bearing body 5 by the lower casing 21 and the separate annular piece 22 in the above-described manner, an annular central protruding portion 82 equivalent to the annular piece 22 may be formed integrally with the lower casing body portion 32, as shown in FIG. 7, and the projection comprising the inner annular projection 19 and the outer annular projection 20 may be formed integrally with the annular surface 4 of the annular central protruding portion 82, to cause the projection including the inner annular projection 19 and the outer annular projection 20 to slidably abut against the sheet 6. In this case, as shown in FIG. 7, the inner peripheral-side cylindrical protruding portion 34 and the outer peripheral-side cylindrical protruding portion 36 may be integrated with the annular central protruding portion 82. Alternatively, the annular central protruding portion 82 may be formed integrally with the lower casing body portion 32 by creating a radial gap between the inner peripheral-side cylindrical protruding portion 34 and the outer peripheral-side cylindrical protruding portion 36, or the annular central protruding portion 82 may be formed integrally with the lower casing body portion 32 by omitting the inner peripheral-side cylindrical protruding portion 34 and the outer peripheral-side cylindrical protruding portion 36.

Figure 8:
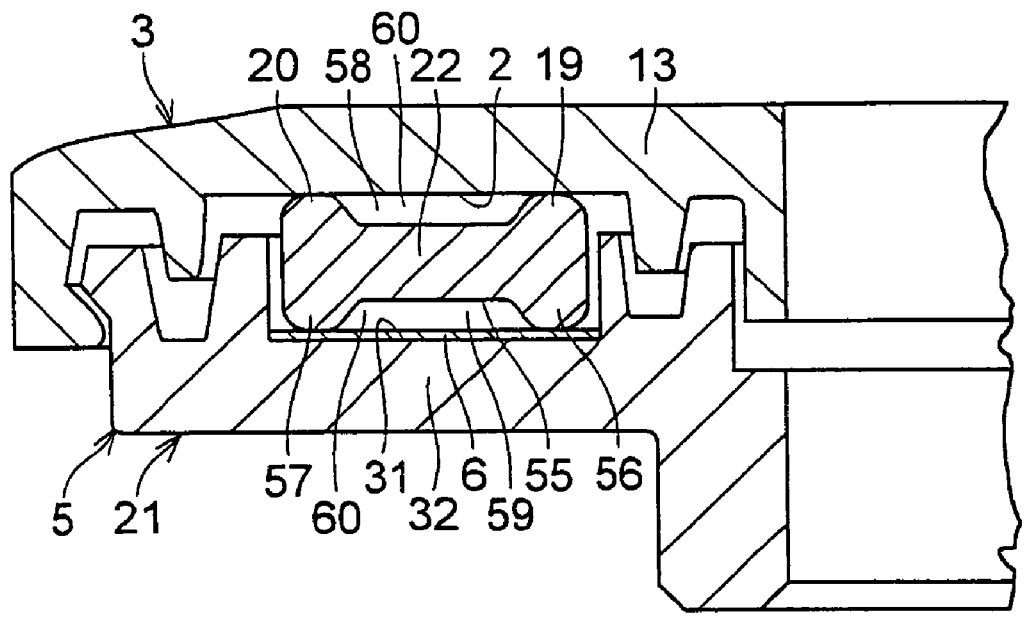
FIG. 8 is a fragmentary cross-sectional view of a still further preferred embodiment of the invention.
Figure 9:
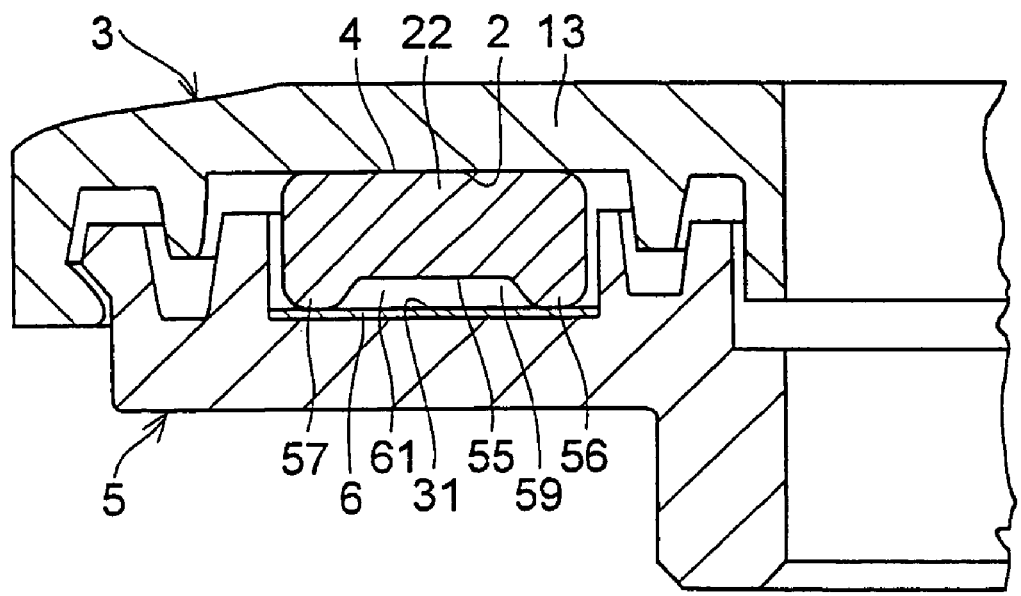
FIG. 9 is a fragmentary cross-sectional view of a further preferred embodiment of the invention.
Figure 10:
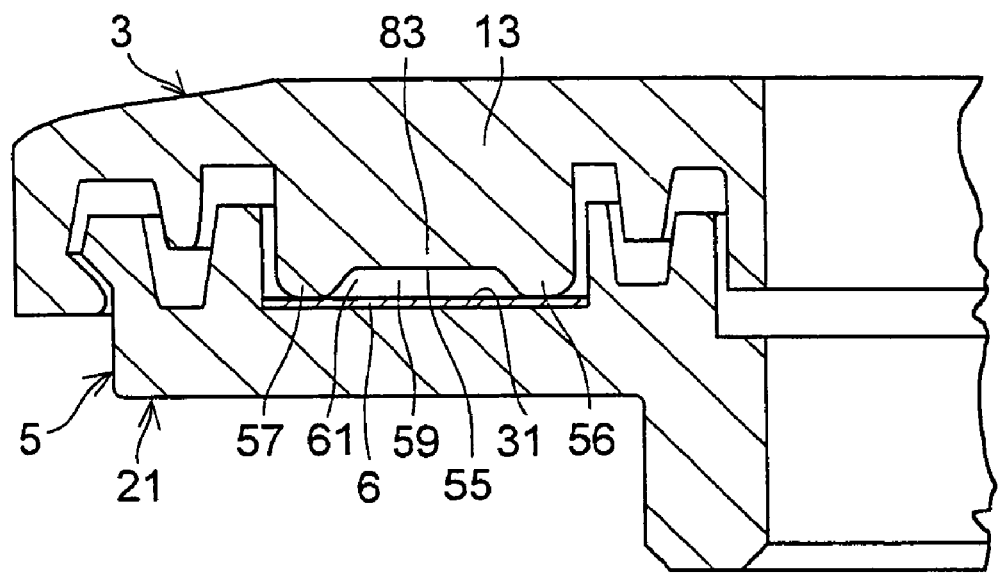
FIG. 10 is a fragmentary cross-sectional view of a still further preferred embodiment of the invention.

In addition, although with the above-described sliding bearing 1 the sheet 6 is interposed between the annular surfaces 2 and 4, alternatively, the sheet 6 may be interposed between the annular surface 31 and the annular surface 55, as shown in FIGS. 8 to 10, to allow the sheet 6 to slidably abut against both the annular surface 31 and the projection comprising the inner annular projection 56 and the outer annular projection 57. Here, the projection including the inner annular projection 19 and the outer annular projection 20 of the annular piece 22 may be slidably abutted against the annular surface 2, as shown in FIG. 8. Alternatively, the flat annular surface 4 of the annular piece 22 may be slidably abutted against the annular surface 2, as shown in FIG. 9. Still alternatively, as shown in FIG. 10, the upper casing 3 may be constructed by an annular central protruding portion 83 which is formed integrally with the upper casing body portion 13 and which is equivalent to the annular piece 22 and is similar to the annular central protruding portion 82. In either case, it suffices if the closed recess 59 is fully filled with the fluid 61 constituted by silicone-based grease. Furthermore, a closed space equivalent to the closed space 81 may be formed between the annular surface 31 and the annular surface 55, and such a closed space may be fully filled with the fluid 61 constituted by silicone-based grease or the like in the same way as described above.

Figure 11:
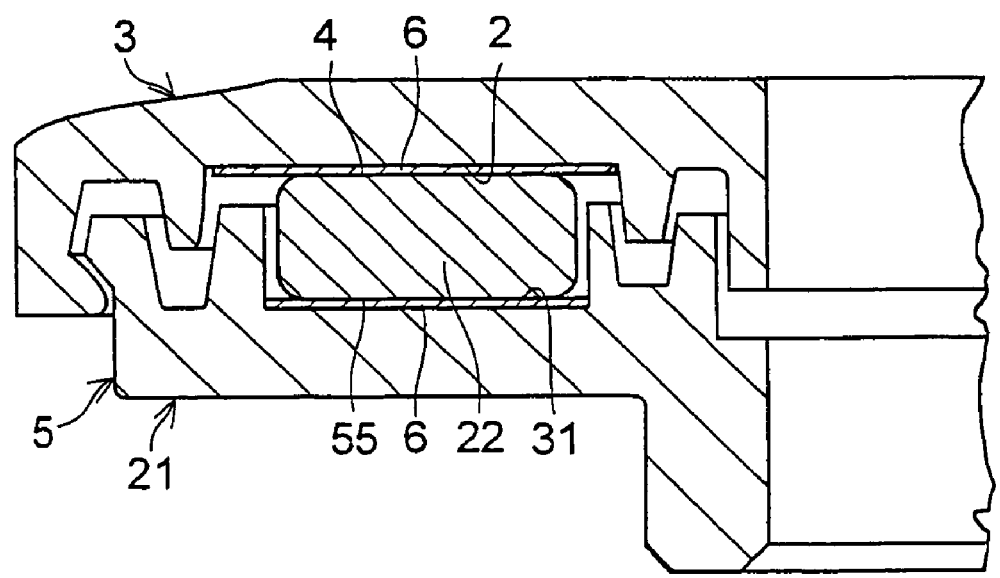
FIG. 11 is a fragmentary cross-sectional view of a further preferred embodiment of the invention.

In addition, as shown in FIG. 11, for example, the sheet 6 may be interposed between the annular surface 2 and the annular surface 4, and another sheet 6 may be interposed between the annular surface 31 and the annular surface 55. In this case, the sheet 6 may be slidably abutted against the annular surface 2 and the inner annular projection 19 and the outer annular projection 20, and the synthetic resin-made other sheet 6 may be slidably abutted against the annular surface 31 and the inner annular projection 56 and the outer annular projection 57. However, as shown in FIG. 11, both sheets 6 may be slidably abutted against the flat annular surfaces 4 and 55 respectively by using the annular piece 22 having the flat annular surfaces 4 and 55. The synthetic resin-made other sheet 6 is also sufficient if it is formed of a synthetic resin including at least one of polyamide resin, polyester resin, polyolefin resin, polycarbonate resin, and fluororesin and has a thickness of from 0.05 mm to 1.0 mm.

Figure 12:
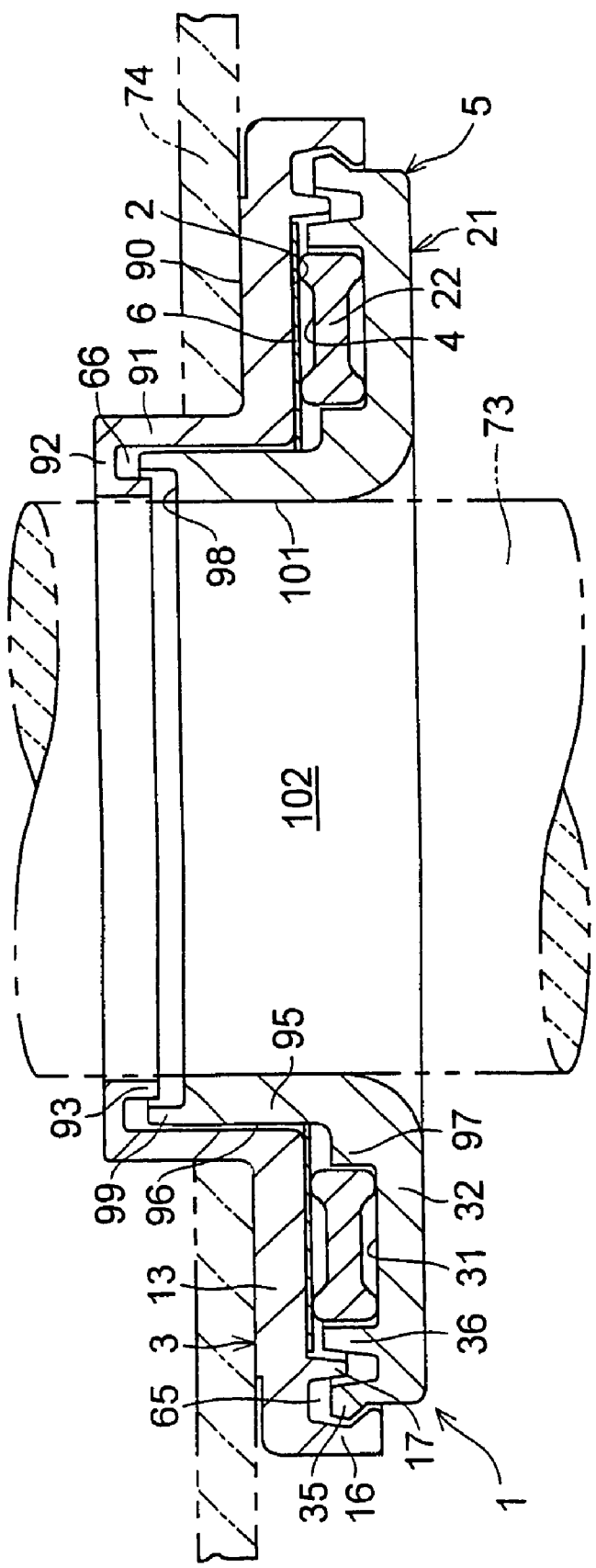
FIG. 12 is a cross-sectional view of a further preferred embodiment of the invention.

Incidentally, with the above-described sliding bearing 1, the upper casing 3 is constructed by integrally forming the innermost peripheral-side cylindrical suspended portion 14 and the inner peripheral-side cylindrical suspended portion 15 on the annular surface 2 of the upper casing body portion 13, and the lower casing 21 is constructed by integrally forming the innermost peripheral-side cylindrical protruding portion 33 and the inner peripheral-side cylindrical protruding portion 34 or the like on the annular surface 31 of the lower casing body portion 32. Alternatively, however, as shown in FIG. 12, the upper casing 3 may be constructed by including a cylindrical portion 91 formed integrally with an annular outer surface 90 of the upper casing body portion 13; an annular portion 92 formed integrally with the cylindrical portion 91; and a cylindrical suspended portion 93 formed integrally with the annular portion 92. Meanwhile, the lower casing 21 may be constructed by including a cylindrical portion 95 formed integrally with the annular surface 31 of the lower casing body portion 32 and disposed substantially concentrically with and radially inwardly of the cylindrical portion 91; an annular projecting portion 97 formed integrally with the annular surface 31 of the lower casing body portion 32 and a cylindrical outer surface 96 of the cylindrical portion 95; and a cylindrical projecting portion 99 formed integrally with an annular end face 98 of the cylindrical portion 95 and disposed between the cylindrical portion 91 and the cylindrical suspended portion 93.

With the sliding bearing 1 shown in FIG. 12, the labyrinth 66 is arranged to be formed between the upper casing 3 and the lower casing 21 by the cylindrical portion 91, the annular portion 92, the cylindrical suspended portion 93, the cylindrical portion 95, and the cylindrical projecting portion 99. The arrangement provided is such that an upper portion of the piston rod 73 is inserted into a circular hole 102 defined by a cylindrical inner surface 101 of the cylindrical portion 95 so as to be rotatable about the axis O in the R direction with respect to the upper casing 3 and the lower casing 21. Further, also with the sliding bearing 1 shown in FIG. 12, the labyrinth 65 is formed between the upper casing 3 and the lower casing 21 by the upper casing body portion 13, the cylindrical suspended engaging portion 16, and the outer peripheral-side cylindrical suspended portion 17 and by the lower casing body portion 32, the cylindrical protruding engaging portion 35, and the outer peripheral-side cylindrical protruding portion 36, and the sheet 6 is interposed between, for instance, both annular surfaces 2 and 4, in the same way as described above.

Figure 13:
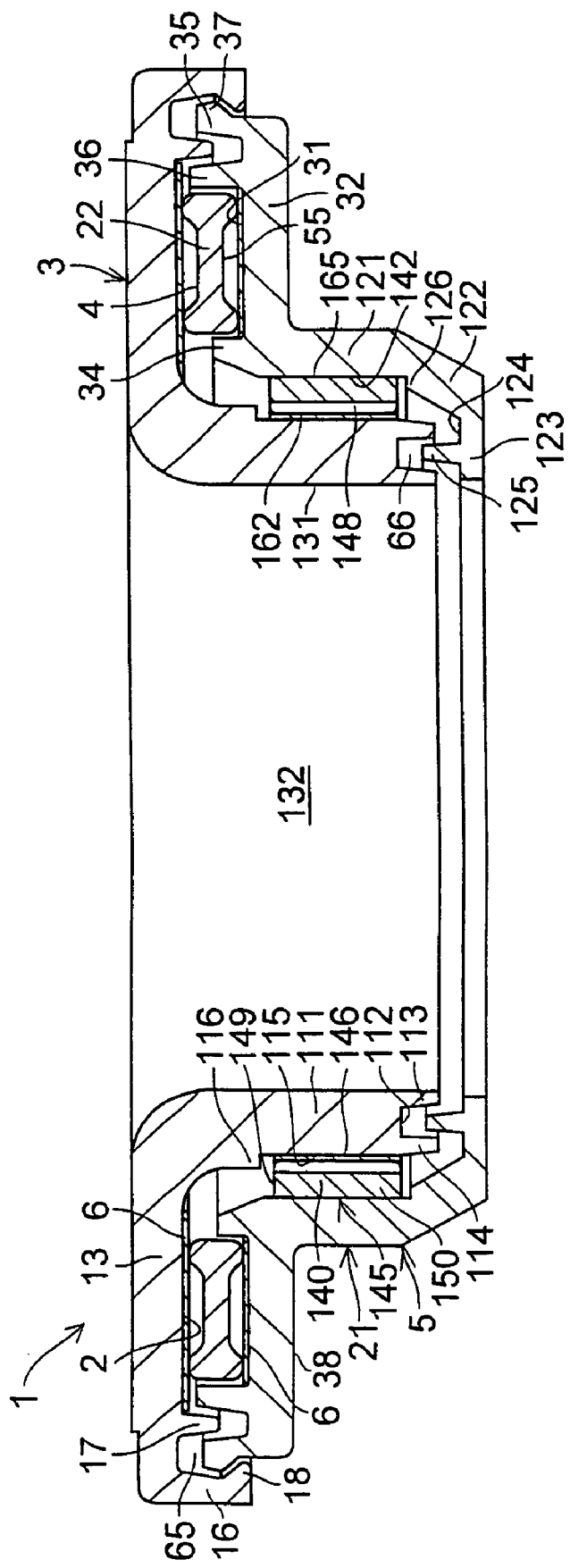
FIG. 13 is a cross-sectional view of a further preferred embodiment of the invention.

Furthermore, the upper casing 3 and the lower casing 21 may be constructed, as shown in FIG. 13. With the sliding bearing 1 shown in FIG. 13, in addition to the above-described upper casing body portion 13, cylindrical suspended engaging portion 16, outer peripheral-side cylindrical suspended portion 17, and engaging hook portion 18, the upper casing 3 includes a suspended cylindrical portion 111 formed integrally with the annular surface 2 of the upper casing body portion 13; a pair of suspended annular portions 113 and 114 which are mutually substantially concentric and formed integrally with an end face 112 of the suspended cylindrical portion 111; and a cylindrical portion 116 formed integrally with the annular surface 2 of the upper casing body portion 13 and a radially outer cylindrical surface 115 of the suspended cylindrical portion 111. Meanwhile, in addition to the above-described lower casing body portion 32, inner peripheral-side cylindrical protruding portion 34, cylindrical protruding engaging portion 35, outer peripheral-side cylindrical protruding portion 36, and engaging hook portion 37, the lower casing 21 includes a cylindrical portion 121 disposed on a radially inner peripheral side of the lower casing body portion 32 and formed integrally with the outer surface 38 of the lower casing body portion 32; a hollow truncated cone portion 122 formed integrally with an end face of the cylindrical portion 121 by forming an annular stepped portion 126; an annular portion 123 formed integrally on an inner peripheral surface of the truncated cone portion 122; and a cylindrical projecting portion 125 formed integrally with an annular surface 124 of the annular portion 123 and disposed between the pair of suspended annular portions 113 and 114.

With the sliding bearing 1 shown in FIG. 13, in addition to the labyrinth 65 which is similar to the above-described one, the labyrinth 66 is formed between the upper casing 3 and the lower casing 21 by the suspended cylindrical portion 111, the pair of suspended annular portions 113 and 114, the annular portion 123, and the cylindrical projecting portion 125, and the sheets 6 are for example respectively interposed between the annular surfaces 2 and 4 and between the annular surfaces 31 and 55. The arrangement provided is such that the upper portion of the piston rod 73 is inserted into a circular hole 132 defined by a cylindrical inner surface 131 of the suspended cylindrical portion 111 so as to be rotatable about the axis O in the R direction with respect to the upper casing 3 and the lower casing 21.

Figure 14:
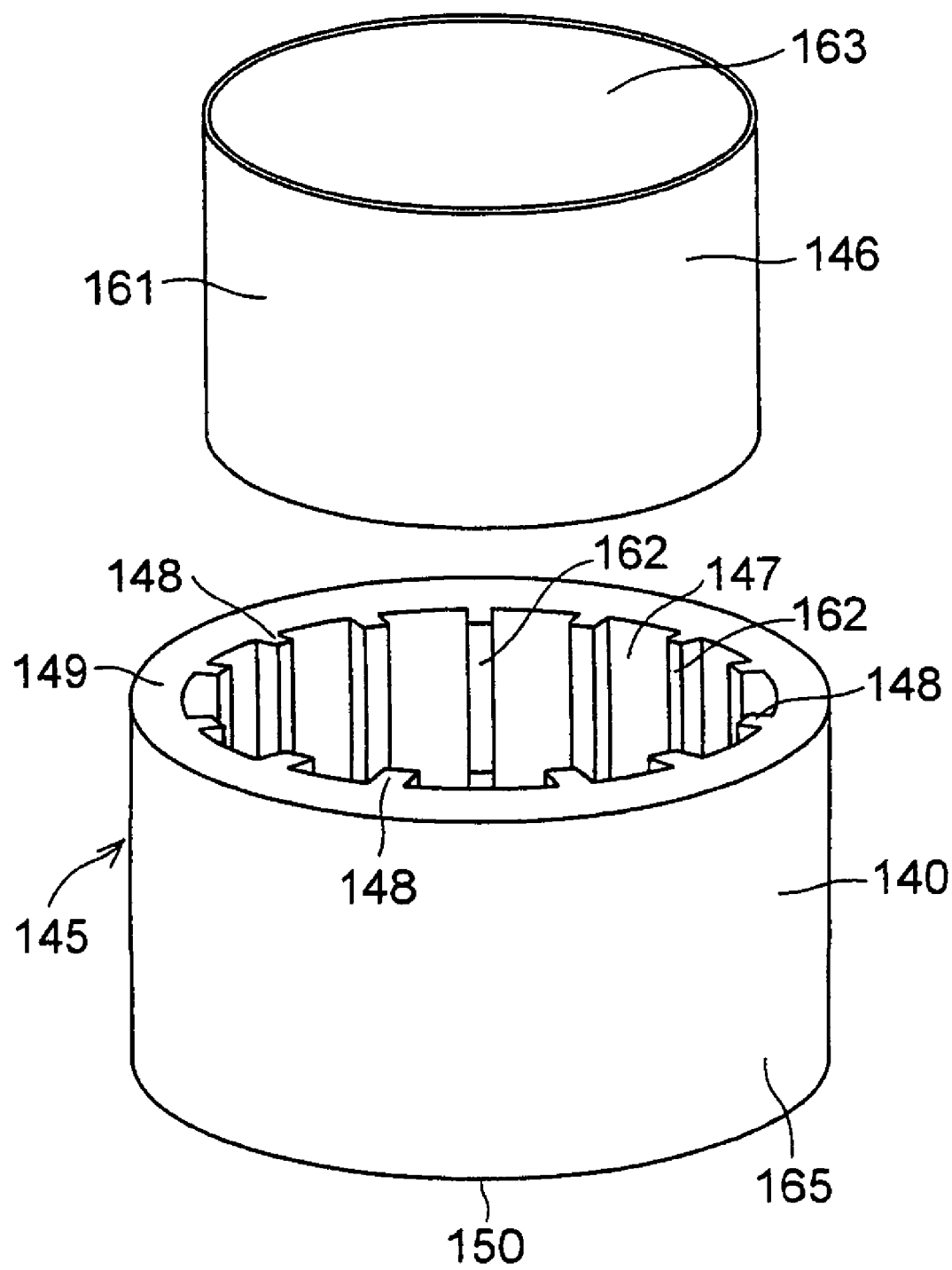
FIG. 14 is a perspective view of a radial bearing body and a sheet of the embodiment shown in FIG. 13.

Incidentally, as in the sliding bearing 1 shown in FIG. 13, a cylindrical radial bearing body 145 and a cylindrical sheet 146 may be interposed between the cylindrical surface 115 on the radially outer side of the suspended cylindrical portion 111 and a cylindrical surface 142 on the radially inner side of the cylindrical portion 121 opposing the cylindrical surface 115. Here, as shown in FIG. 14, the radial bearing body 145 has a cylindrical portion 140; and a plurality of projections 148 formed integrally with a cylindrical inner surface 147 of the cylindrical portion 140 and extending from one annular end face 149 of the cylindrical portion 140 to the other annular end face 150 of the cylindrical portion 140. In the same way as the sheet 6, the cylindrical sheet 146 is formed of a synthetic resin including at least one of polyamide resin, polyester resin, polyolefin resin, polycarbonate resin, and fluororesin and has a thickness of from 0.05 mm to 1.0 mm. The cylindrical sheet 146 is disposed in the radial bearing body 145. The cylindrical sheet 146 at its cylindrical outer surface 161 slidably abuts against apex surfaces 162 of the plurality of projections 148, and at its cylindrical inner surface 163 slidably abuts against the cylindrical surface 115 of the suspended cylindrical portion 111.

The sliding bearing 1 includes the upper casing 3 and the bearing body 5 respectively having the above-described mutually opposing cylindrical surfaces 115 and 142, the synthetic resin-made cylindrical sheet 146 is interposed between the cylindrical surfaces 115 and 142 and slidably abuts against at least one of both cylindrical surfaces 115 and 142, i.e., against the cylindrical surface 115 in this embodiment, and a cylindrical outer surface 165 of the cylindrical portion 140 slidably abuts against the cylindrical surface 142. In this sliding bearing 1, the radial load of the bearing body 5 with respect to the upper casing 3 can be received by means of the radial bearing body 145 and the cylindrical sheet 146. Thus, the relative rotation of the lower casing 21 about the axis O of the upper casing 3 in the R direction with respect to the upper casing 3 can be effected with an extremely low frictional resistance even under the radial load.

The radial bearing body 145 may be constructed by only the cylindrical portion 140 without providing the plurality of projections 148. Further, the plurality of projections 148 may be formed integrally on the outer surface 165 of the cylindrical portion 140. In this case, it suffices if the sheet 146 is disposed on the radially outer side of the radial bearing body 145. Furthermore, the plurality of projections 148 may be formed integrally on both the inner surface 147 and the outer surface 165 of the cylindrical portion 140. In any one of the above-described forms of the radial bearing body 145, the sheets 146 may respectively disposed on both the radially outer and inner sides of the radial bearing body 145.

Figure 15:
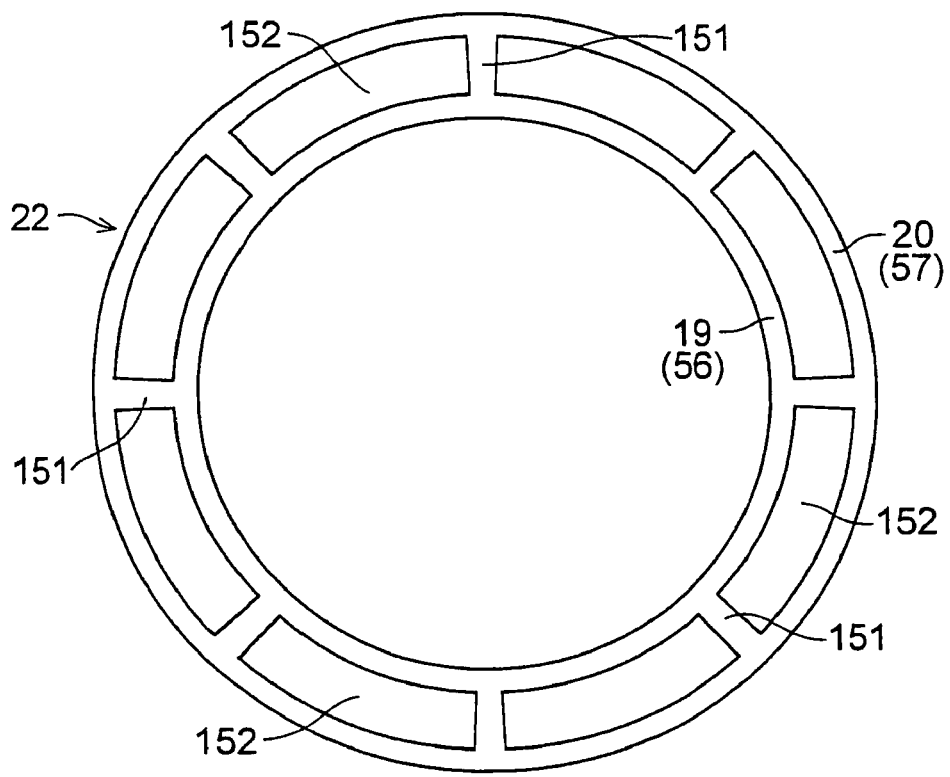
FIG. 15 is a plan view of another example of the annular piece in accordance with the invention.

As shown in FIG. 15, the annular piece 22 may be formed by including, in addition to at least one of the set of the inner annular projection 19 and the outer annular projection 20 and the set of the inner annular projection 56 and the outer annular projection 57, the protrusions formed integrally with the annular surface 4 (55) and having a plurality of radial protrusions 151 which are integrally connected to the inner annular projection 19 (56) and the outer annular projection 20 (57), respectively, so as to extend radially and are arranged at equal intervals in the circumferential direction. In the case of the annular piece 22 shown in FIG. 15, it suffices if a plurality of closed recesses 152, which are mutually independent of each other and are surrounded by the inner annular projection 19 (56) and the outer annular projection 20 (57) and by the plurality of radial protrusions 151, are fully filled with the fluid 60 (61) constituted by silicone-based grease similar to the above-described one.

Figure 16:
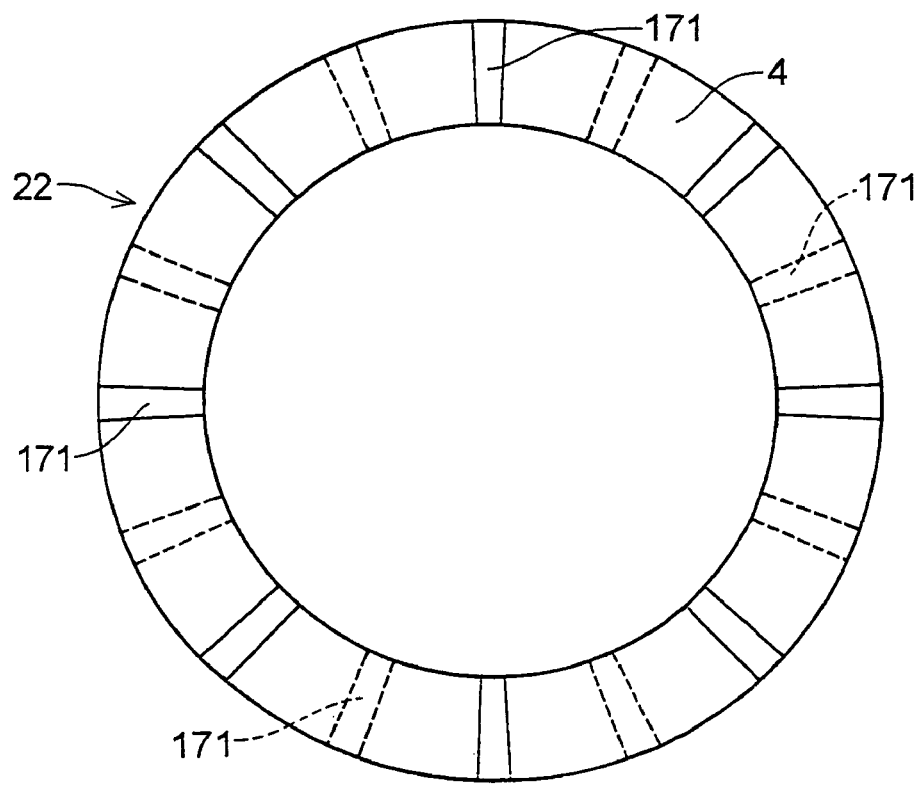
FIG. 16 is a plan view of still another example of the annular piece in accordance with the invention.

Furthermore, instead of forming the annular piece 22 by including the projection having the inner annular projection 19 (56) and the outer annular projection 20 (57), as shown in FIG. 16, the annular piece 22 may be formed by including a protrusion constituted by a plurality of radial protrusions 171 formed integrally on at least one of the annular surfaces 4 and 55 and arranged at equal intervals in the circumferential direction. In a case where the plurality of radial protrusions 171 are formed on both annular surfaces 4 and 55, it suffices if the plurality of radial protrusions 171 on the annular surface 4 and the plurality of radial protrusions 171 on the annular surface 55 are arranged by being positionally offset from each other in the circumferential direction.

Figure 17:
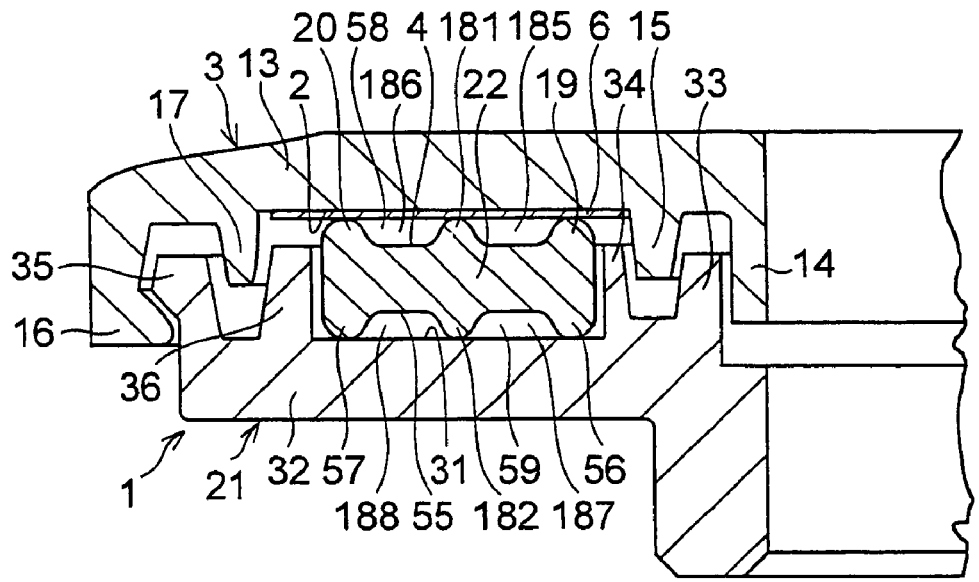
FIG. 17 is a cross-sectional view of a further preferred embodiment of the invention.
Figure 18:
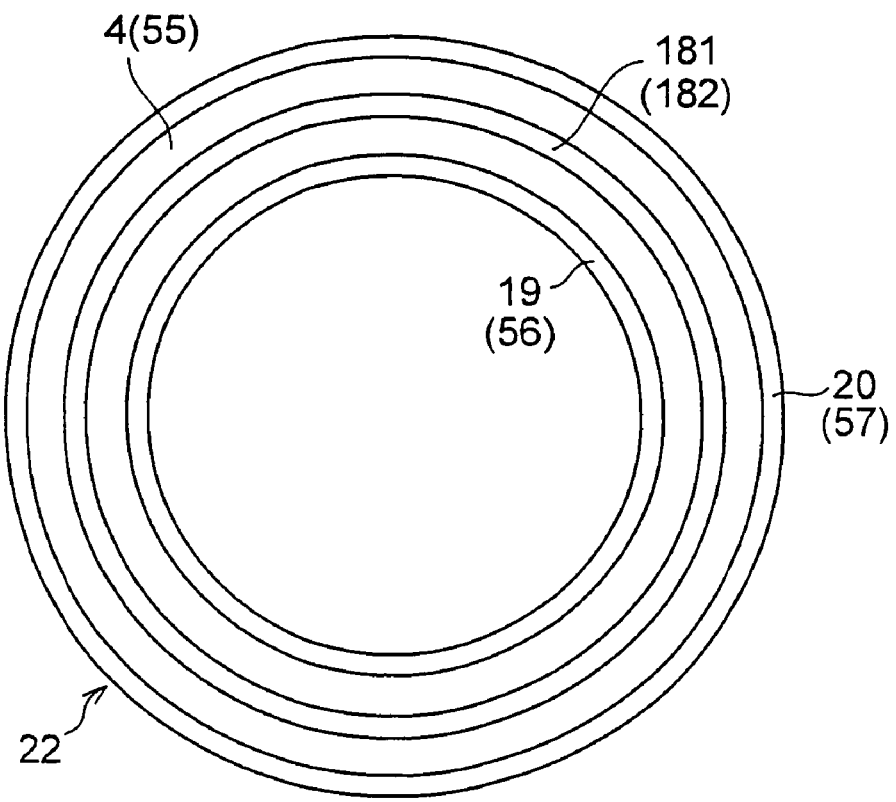
FIG. 18 is a plan view of the annular piece of the embodiment shown in FIG. 17.

In addition, as shown in FIGS. 17 and 18, the annular piece 22 may be formed by including, in addition to at least one of the set of the inner annular projection 19 and the outer annular projection 20 and the set of the inner annular projection 56 and the outer annular projection 57, at least one of the projection further having an intermediate annular projection 181 formed integrally with the annular surface 4 and disposed between the inner annular projection 19 and the outer annular projection 20 in a radial direction and substantially concentrically with the inner annular projection 19 and the outer annular projection 20, as well as the other projection further having other intermediate annular projection 182 formed integrally with the annular surface 55 and disposed between the inner annular projection 56 and the outer annular projection 57 in the radial direction and substantially concentrically with the inner annular projection 56 and the outer annular projection 57.

With the sliding bearing 1 using the annular piece 22 shown in FIGS. 17 and 18 for the upper casing 3, the sheet 6, and the lower casing 21 of the form shown in FIG. 1, the closed recesses 58 are formed by an annular inner closed recess 185 surrounded by the inner annular projection 19 and the intermediate annular projection 181 and an annular outer closed recess 186 surrounded by the intermediate annular projection 181 and the outer annular projection 20. Meanwhile, the closed recesses 59 are formed by an annular inner closed recess 187 surrounded by the inner annular projection 56 and the intermediate annular projection 182 and an annular outer closed recess 188 surrounded by the intermediate annular projection 182 and the outer annular projection 57.

With the sliding bearing 1 using the annular piece 22 shown in FIGS. 17 and 18 and including the projection having the intermediate annular projections 181 and 182 in addition to the inner annular projections 19 and 56 and the outer annular projections 20 and 57, even if an unbalanced load is applied to that sliding bearing 1 in the thrust direction, it is possible to reduce uneven deflection of the inner annular projections 19 and 56 and the outer annular projections 20 and 57. Furthermore, it is possible to favorably hold the closed state (hermetically sealed state) of the closed recesses 58 formed by the inner closed recess 185 and the outer closed recess 186 and the closed recesses 59 formed by the inner closed recess 187 and the outer closed recess 188. Thus, the reception of the thrust load by the fluids 60 and 61 can be maintained over long periods of time without leakage of the fluids 60 and 61 from the closed recesses 58 and 59.

The above-described intermediate annular projections 181 and 182 may be applied, as required, to the annular piece 22 and the sliding bearing 1 of the respective forms shown in FIGS. 5 to 10, and FIGS. 12, 13, and 15 in the same way as described above. Furthermore, each of the intermediate annular projections 181 and 182 is not limited to one piece, and may consist of a plurality of pieces arranged substantially concentrically with each other. In addition, either one of the intermediate annular projections 181 and 182 may be omitted.

The invention claimed is:

1. A sliding bearing comprising:
a first bearing body having an annular surface;
a second bearing body which is superposed on said first bearing body so as to be rotatable about an axis of said first bearing body, and has an annular surface opposed to the annular surface of said first bearing body; and
a synthetic resin-made annular sheet which is interposed between the annular surfaces and slidably abuts against at least one of said bearing bodies,
said second bearing body having a projection formed integrally on the annular surface thereof, and said sheet being interposed between said projection and the annular surface of said first bearing body and slidably abuts against the annular surface of said first bearing body, said projection includes at least an inner annular projection disposed on an inner peripheral portion of the annular surface of said second bearing body and an outer annular projection disposed on the annular surface of said second bearing body radially outwardly of and substantially concentrically with said inner annular projection, said inner and outer annular projections abutting against said sheet,
said second bearing body being formed on the annular surface thereof with a recess which is surrounded by said outer annular projection, and by which said inner annular projection is surrounded,
an annular closed space being formed between said annular sheet and the annular surface of said first bearing body and corresponding to said recess, said annular closed space, in which a fluid is filled, being closed by said annular sheet and the annular surface of said first bearing body.

2. The sliding bearing according to claim 1, wherein said annular sheet is formed of a synthetic resin including at least one of polyamide resin, polyester resin, polyolefin resin, polycarbonate resin, and fluororesin.

3. The sliding bearing according to claim 1, wherein said annular sheet has a thickness of from 0.05 mm to 1.0 mm.

4. The sliding bearing according to claim 1, wherein both of said bearing bodies are formed of a synthetic resin.

5. The sliding bearing according to claim 1, wherein both of said bearing bodies are formed of a synthetic resin including at least one of polyacetal resin, polyamide resin, polyester resin, polyolefin resin, polycarbonate resin, and fluororesin.

6. The sliding bearing according to claim 1, wherein said first bearing body is formed of polyacetal resin, and said second bearing body is formed of a synthetic resin including at least one of polyacetal resin, polyamide resin, polyolefin resin, and fluororesin.

7. The sliding bearing according to claim 1, wherein said first bearing body at a radially outer peripheral edge portion thereof is adapted to be resiliently fitted to said second bearing body at a radially outer peripheral edge portion of said second bearing body.

8. The sliding bearing according to claim 1, wherein a labyrinth is formed between said bearing bodies in at least one of the outer peripheral edge portions and inner peripheral edge portions, as viewed in a radial direction, of both of said bearing bodies.

9. The sliding bearing according to claim 1, wherein the fluid filled in said closed space is adapted to receive a thrust load.

10. The sliding bearing according to claim 1, wherein said projection is adapted to be flexurally deformed under a thrust load so as to reduce a fluid filling capacity of said closed space.

11. The sliding bearing according to claim 1, wherein said projection is adapted to be flexurally deformed under a thrust load so as to cause the fluid in said closed space to generate internal pressure by reducing a fluid filling capacity of said closed space.

12. The sliding bearing according to claim 1, wherein the fluid includes at least one of grease and lubricating oil.

13. The sliding bearing according to claim 1, wherein the fluid is constituted by silicone-based grease.

14. The sliding bearing according to claim 1, wherein said projection further includes a radial protrusion extending radially and connected integrally to respective ones of said inner annular projection and said outer annular projection.

15. The sliding bearing according to claim 1, wherein said second bearing body includes a bearing member and an annular piece disposed between said bearing member and said first bearing body so as to be rotatable about the axis of said first bearing body with respect to said first bearing body, and said annular piece has said annular surface opposing the annular surface of said first bearing body as well as said projection formed integrally on said annular surface.

16. The sliding bearing according to claim 15, wherein said bearing member is formed of polyacetal resin, and said annular piece is formed of a synthetic resin including at least one of polyamide resin, polyolefin resin, and fluororesin.

* * * * *